Aug. 7, 1923.         W. D. HICKS         1,464,360
MACHINE AND METHOD FOR MANUFACTURING LATH BOARD
Filed Dec. 31, 1921        2 Sheets-Sheet 1
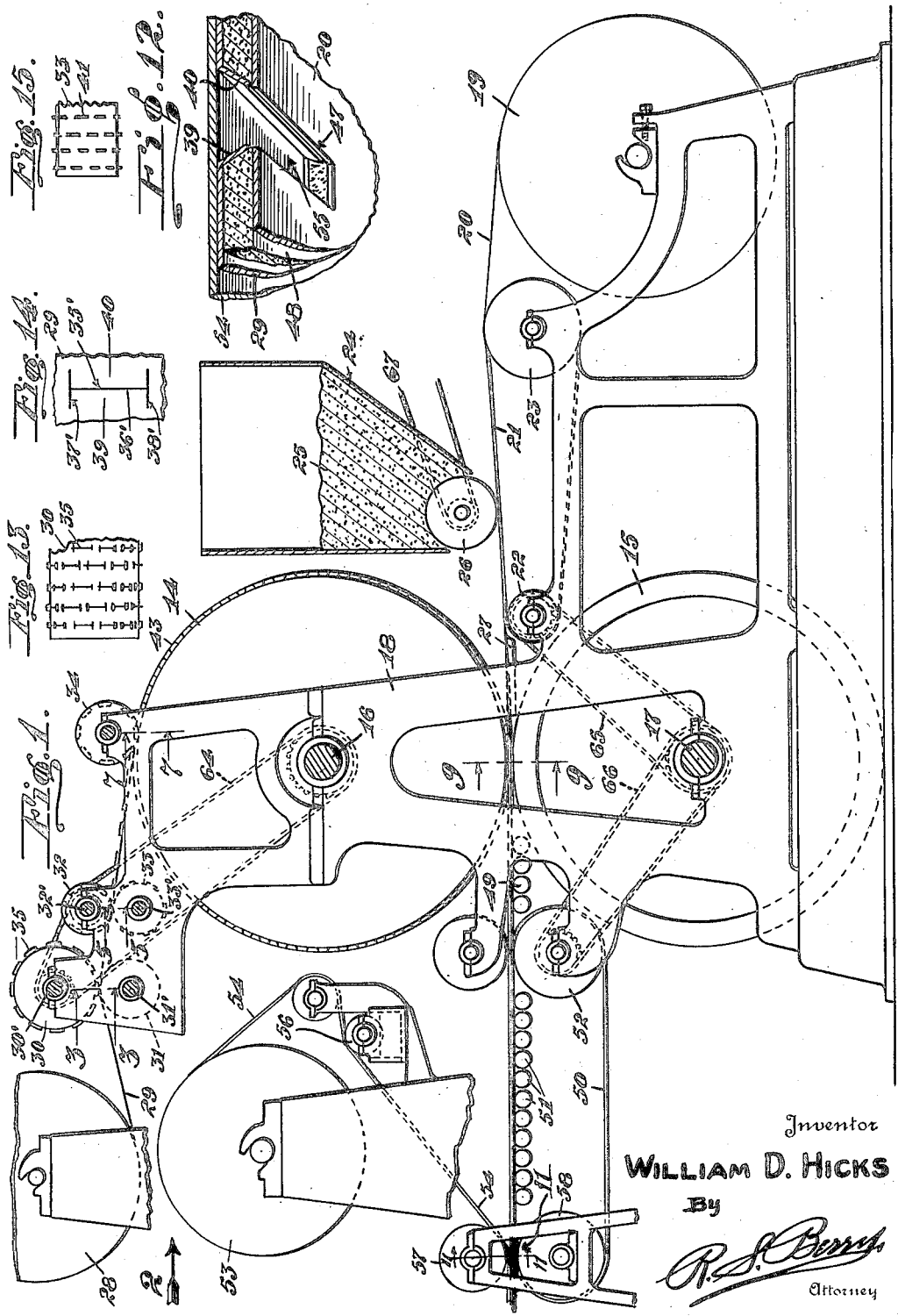

Aug. 7, 1923. 1,464,360
W. D. HICKS
MACHINE AND METHOD FOR MANUFACTURING LATH BOARD
Filed Dec. 31, 1921 2 Sheets-Sheet 2
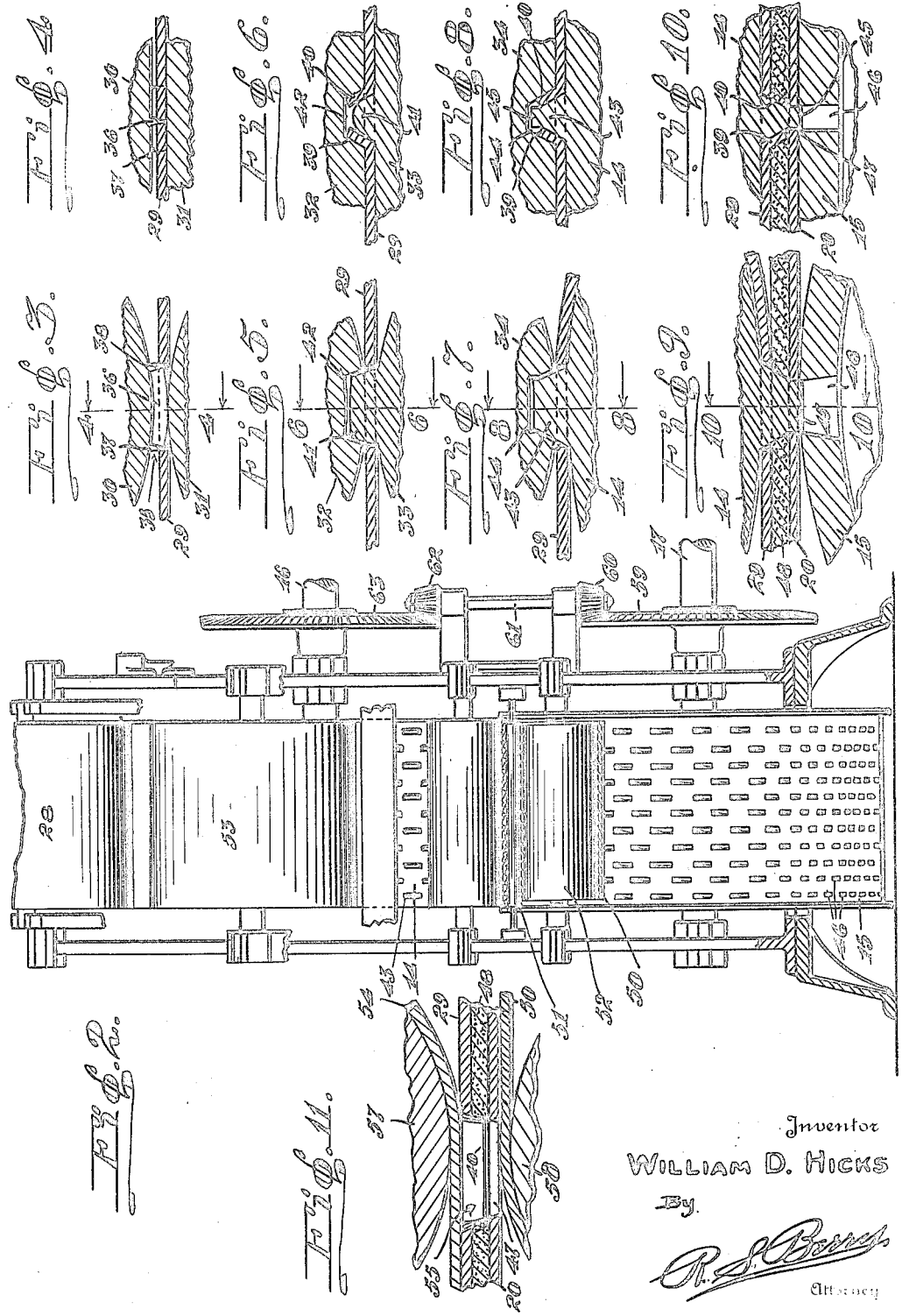
Inventor
WILLIAM D. HICKS
By
Attorney Patented Aug. 7, 1923.

1,464,360

UNITED STATES PATENT OFFICE.

WILLIAM D. HICKS, OF INGLEWOOD, CALIFORNIA.

MACHINE AND METHOD FOR MANUFACTURING LATH BOARD.

Application filed December 31, 1921. Serial No. 526,177.

*To all whom it may concern:*

Be it known that I, WILLIAM D. HICKS, a citizen of the United States, residing at Inglewood, in the county of Los Angeles and State of California, have invented new and useful Improvements in a Machine and Method for Manufacturing Lath Board, of which the following is a specification.

This invention relates to the manufacture of a combined composition wall board and lath, and particularly pertains to a mechanism for forming apertured panels adapted for use in covering walls and the like either as a smooth finished surface or to serve as a lath to receive plaster or other compositions..

An object of this invention is to provide a machine whereby a plastic material or composition may be formed in panels or sheets between surface coverings and the panels or sheets provided with a series of apertures or channels on one side thereof and provided with a smooth unapertured surface on the other side.

Another object is to provide means for forming the apertures with inclined side walls to give them a dove tail cross section, and whereby the inclined walls may be covered with a non-absorptive sheet material.

Another object is to provide a means for forming a composition board with recesses having inclined side walls to form the bottom portion of the recesses of greater width than the open outer portion, and also to provide a construction whereby the recesses may be thus formed by means of rolling dies.

A further object is to provide a means whereby a plastic material may be fed between two continuously movable facing sheets to form a board and each sheet and the composition formed with registering openings while in motion, and whereby one of the sheets will have its openings formed with side flaps, and the flaps pressed against the sides of the openings in the composition.

With the foregoing objects in view together with such other objects and advantages as may subsequently appear my invention consists in the parts and the construction, combination and arrangement of parts or their equivalents hereinafter described and claimed, and more particularly resides in a machine whereby a plastic material may be delivered to an imperforate sheet of facing material and covered by a second sheet of facing material and the second sheet formed with perforations having side flaps, said flaps pressed into the plastic, and at the same time apertures formed thru the plaster and perforations formed in the first sheet, and a backing sheet applied to cover the openings previously formed to convert the openings into channels or recesses. The invention is illustrated by way of example in the accompanying drawings, in which—

Fig. 1 is a view of the machine as seen in side elevation, with parts broken away.

Fig. 2 is a view in end elevation as seen in the direction indicated by the arrow 2 in Fig. 1.

Fig. 3 is a detail in section as seen on the line 3—3 of Fig. 1 illustrating the slit forming cutter.

Fig. 4 is a view in section as seen on the line 4—4 of Fig. 3.

Fig. 5 is a detail in section as seen on the line 5—5 of Fig. 1 illustrating the flap turning die.

Fig. 6 is a view in section as seen on the line 6—6 of Fig. 5.

Fig. 7 is a detail in section as seen on the line 7—7 of Fig. 1 illustrating the manner of feeding the slitted sheet to a punching die.

Fig. 8 is a view in section as seen on the line 8—8 of Fig. 7.

Figure 9 is a detail in section as seen on the line 9—9 of Fig. 1 showing the punching die.

Fig. 10 is a view in section as seen on the line 10—10 of Fig. 9.

Figure 11 is a detail in section at the point designated by the numeral 11 in Figure 1, as seen on the plane shown in Figure 1, and illustrating the manner of applying the backing sheet.

Fig. 12 is a detail in section and perspective showing the finished board and illustrating it as seen from its under side as delivered from the machine.

Fig. 13 is a detail in elevation of the slit forming roller.

Fig. 14 is a detail showing the slit as formed by the slit forming roller.

Fig. 15 is a view in elevation of the flap turning roller.

Referring to the drawings more particularly, 14 and 15 indicate a pair of superimposed horizontally disposed rollers fixed on shafts 16 and 17 revolvably carried on a suitable frame 18; the rollers 14 and 15 constituting combined pressing rolls and dies as will presently appear. The numeral 19 indicates a reel from which a facing sheet 20 is adapted to be unwound; the facing sheet passing from the reel and between the rollers 14 and 15 and extending substantially horizontal over a supporting belt 21 carried on rollers 22 and 23 and arranged adjacent the rollers 14 and 15. Arranged above the belt 21 is a suitable hopper 24 for containing a plastic material 25 from which the plastic may be delivered in a thin layer to the top surface of the facing sheet 20 by a feed roller 26 extending into the hopper and adapted on being rotated to feed the plastic as is common in devices of this character. The facing sheet 20 will thus be covered with the plastic as it passes between the rollers 14 and 15. A panel 27 is provided between the roller 22 and the adjacent faces of the rollers 14 and 15 to support the facing sheet and plastic at this point.

The numeral 28 indicates a reel from which a second facing sheet 29 may be unwound; this facing sheet being fed between a pair of horizontally extending superimposed rollers 30 and 31, thence passed between rollers 32 and 33 and thereafter delivered to the upper portion of the roller 14 between the roller 14 and a superimposed roller 34. The reel 28, rollers 30, 31, 32, and 33 are preferably located above and to one side of the upper portion of the roller 14 and in close proximity thereto.

The roller 30 is provided with a series of circumferentially extending I-shaped blades 35 arranged in rows thruout the length of the roller with the blades spaced apart in each row and the blades of one row staggered in relation to the blades of the adjacent row as shown in Fig. 13. The blades 35 are adapted to form I-shaped slits 35' in the sheet 29 as shown in Fig. 14, as the latter passes between the rollers 30 and 31; the blades being constructed, as shown in Figs. 3 and 4, with a central blade portion 36 extending circumferentially of the roller 30 having its outer edge formed on a radius struck from the center of the roller 30 and adapted to have a rolling contact with the roller 31, so as to form longitudinal slits 36' in the sheet 29, and the ends of the blades 35 are formed with transverse portions 37 and 38 having cutting edges extending parallel with the longitudinal surface of the roller, adapted to contact the roller 31 to form transverse slits 37' and 38' at the ends of the slits 36' thus forming flaps 39 and 40 on the opposite sides of the slits 36'.

The roller 33 is formed with tapered teeth 41 arranged in circumferential rows with the teeth spaced apart in each row and with the teeth in the adjacent rows staggered in relation to each other, as shown in Fig. 15, and which teeth are adapted to mesh with recesses 42 formed in the surface of the roller 32 and are designed to press the flaps 39 and 40 against the sides of the recesses 42 as particularly shown in Fig. 6. It will now be seen that as the sheet 29 passes from the rollers 32 and 33 it will be formed with longitudinally extending elongated openings having upturned flaps on the sides of each opening.

The roller 14 is provided with circumferential rows of teeth 43; the teeth being spaced apart in each row and staggered relative to each other in adjacent rows and are designed to project thru the openings in sheet 29 and to extend into recesses 44 in the roller 34; the roller 34 serving to press the sheet 29 against the periphery of the roller 14 and press the flaps 39 and 40 tight against the sides of the teeth 43. The teeth 43 are formed with inclined side walls as shown in Fig. 8 and also with inclined end walls as shown in Fig. 7. The outer portions of the teeth 43 are rectangular so as to provide substantially parallel side walls and end walls to form a punching die 45 at the outer end of each tooth 43 adapted to register with peripheral slots 46 formed in the drum 15 whereby rectangular openings 47 will be formed in the lower facing sheet 20 as the latter passes between the rollers 14 and 15. The teeth 43 are of such length as to pass thru the facing sheet 29 on the roller 14, thru the plastic layer 48 on the sheet 20, and thru the sheet 20, thus forming slots in the plastic having inclined side and end walls with the flaps 39 and 40 extending over the side walls of the slots as shown in Fig. 12. The product as delivered from between the rollers 14 and 15 will thus comprise a sheet consisting of a plastic body between facing sheets having rows of longitudinally extending slots of dove-tail cross section with the slots in adjacent rows staggered in relation to each other; the sheet being delivered from between the rollers with the widest portion of the slots opening upwardly. A series of supporting rollers 49 are provided to receive and carry the strip delivered from the rollers 14 and 15 from which the strip passes to a conveyor belt 50 supported on rollers 51 and passing around a drum 52.

The numeral 53 indicates a reel from which a backing sheet 54 is adapted to be unwound, which backing sheet is applied to the sheet 29 to extend over the slots in the latter and convert the openings previously formed thru the board into recesses or channels 55 as shown in Fig. 12. The backing sheet is passed over an adhesive distributing roller 56 by means of which a suitable adhesive material is applied thruout the under side of the sheet whereby when the backing sheet is applied to the sheet 29 it will firmly adhere thereto. The backing sheet is here shown as applied by passing it with the apertured board between a pair of rollers 57 and 58 by which the backing sheet is pressed firmly in place on the board.

The various rollers may be rotated in any desired manner and any suitable driving mechanism may be employed.

I have here shown the shaft 17 as constituting a drive shaft and as fitted with a beveled gear 59 meshing with a pinion 60 on a vertical shaft 61 carrying a pinion 62 meshing with a beveled gear 63 on the shaft 16 whereby the shafts 16 and 17 and the drums 14 and 15 thereon may be rotated simultaneously at corresponding speeds. The roller 34 is here shown as driven directly from the roller 14 by the interengagement of the teeth 43 on the latter with the recesses 44. The rollers 30, 31, 32 and 33 are carried on shafts 30', 31', 32' and 33' which may be rotated in any desired manner, being here shown as driven from the shaft 16 by a sprocket chain 64 passing around a sprocket wheel on the shaft 16, around a sprocket wheel on shaft 30' and over a sprocket wheel on shaft 32'. The conveyor belt 21 is driven from the shaft 17 by a sprocket chain 65 passing around a sprocket wheel on the shaft 17 and around a sprocket wheel on a shaft carrying the roller 22. The conveyor belt 50 is driven by a sprocket chain 66 passing around a sprocket wheel on the shaft 17 and around a sprocket wheel on the shaft carrying the roller 52. The plastic feed roller 26 is driven by a sprocket chain 67 leading from any suitable source of power being preferably connected to a mixing mechanism, not shown.

The feed of the backing sheet 54 from the reel 53 is effected by the pull exerted on the sheet as the board on the conveyor belt 50 advances.

The operation of the invention is apparent from the foregoing, it being seen that on rotation of the rollers 14 and 15 in opposite directions with the lower facing sheet 20 extending between the rollers to be engaged by the die teeth 45 a pull will be exerted on the sheet 20 to unwind it from the reel 19 as it is fed between the rollers by the tooth engagement therewith. The movement of the sheet 20 is also assisted by its frictional engagement with the belt 21 and also by the frictional engagement of the conveyor belt 50. The upper facing sheet 29 being engaged by the teeth 41 on roller 33 and also by the teeth 43 on the roller 14 will be caused to feed between the rollers 14 and 15 on rotation thereof at a speed corresponding to that of the lower facing sheet 20. The plastic material 25 will be fed to the lower facing sheet and distributed thruout the surface thereof and will be pressed between the facing sheets 20 and 29 by action of the rollers 14 and 15 and at the same time openings or slots will be formed therethru as before described. The board thus formed will be conveyed in a continuous strip by the conveyor to the backing applying roller 57, from whence the completed product may be conveyed in any suitable manner and cut to desired lengths by means not necessary to be here shown.

The mechanism herein described serves as a means for carrying out the method of manufacturing the combined composition wall board and lath set forth in a pending application filed December 31, 1921, Serial # 526,176, consisting in applying a layer of plastic material to an imperforate facing sheet, forming a second facing sheet with openings having side flaps, pressing the second sheet on the plastic and at the same time press the flaps into the plastic to a point adjacent the first facing sheet and thereby forming openings in the plastic, punching apertures in the first named sheet in register with the openings in the plastic, and thereafter applying a backing sheet to close the openings on one side to form recesses or channels.

While I have shown and described a specific embodiment of my invention I do not limit myself to the exact details of construction and arrangement shown, but may make such modifications and changes as may come within the scope of the appended claims, without departing from the spirit of the invention.

For example, in some instances it may be desired to form the lath board without the backing sheet, in which event the means for applying the sheet would not be employed, and again there are occasions when the use of the flaps 39 and 40 may be dispensed with, altho the flaps serve an important purpose in providing the side walls of a recess with a non-absorptive facing in which event the cutting blades 35 may be dispensed with and punches employed in lieu thereof.

I claim:

1. In a machine for forming a composition board, a pair of pressing rollers, means for feeding an imperforate facing sheet between said rollers, means for coating the sheet with a plastic body before it passes between the rollers, means whereby a second facing sheet may be fed between said rollers to cover the plastic body, means on said rollers whereby apertures may be formed in the plastic body and the facing sheets as they pass between the rollers, and means for applying a backing sheet to one of the facing sheets to cover the apertures and convert same into recesses.

2. In a machine for forming a composition board, a pair of superimposed horizontally extending pressing rollers, means for feeding a lower facing sheet over the lowermost roller, means for feeding an upper facing sheet under the uppermost roller, said facing sheet feeding means being adapted to feed the sheets between the rollers simultaneously, means for applying a plastic layer between said sheets as they pass to the rollers, means for forming openings in the upper facing sheet before it passes between the rollers, and means on the rollers for simultaneously punching openings in the lower facing sheet and forming apertures in the plastic layer in register with the openings in the upper facing sheet.

3. In a machine for forming a composition board, a pair of superimposed horizontally extending pressing rollers, means for feeding a lower facing sheet over the lowermost roller, means for feeding an upper facing sheet under the uppermost roller, said facing sheet feeding means being adapted to feed the sheets between the rollers simultaneously, means for applying a plastic layer between said sheets as they pass to the rollers, means for forming openings in the upper facing sheet before it passes between the rollers, means on the rollers for simultaneously punching openings in the lower facing sheet and forming apertures in the plastic layer in register with the openings in the upper facing sheet, and means for applying a backing sheet to the upper facing sheet to cover the openings therein after forming the apertures in the plastic layer.

4. In a machine for forming a composition board, a pair of rollers, means for passing a lower facing sheet over one of the rollers, means for delivering an upper facing sheet to the other roller, means for formings openings in the upper sheet having side flaps, means for applying a layer of plastic between the sheets as they pass between the rollers, and means for pressing the flaps on the upper sheet into the plastic and at the same time forming apertures in the plastic.

5. In a machine for forming a composition board, a pair of rollers, means for passing a lower facing sheet over one of the rollers, means for delivering an upper facing sheet to the other roller, means for forming openings in the upper sheet having side flaps, means for applying a layer of plastic between the sheets as they pass between the rollers, means for pressing the flaps on the upper sheet into the plastic and at the same time forming apertures in the plastic, and means for punching openings in the lower sheet in register with the apertures in the plastic.

6. In a machine for forming a composition board, a pair of rollers, means for passing a lower facing sheet over one of the rollers, means for delivering an upper facing sheet to the other roller, means for forming openings in the upper sheet having side flaps, means for applying a layer of plastic between the sheets as they pass between the rollers, means for pressing the flaps on the upper sheet into the plastic and at the same time forming apertures in the plastic, means for punching openings in the lower sheet with the apertures in the plastic, in register and means for applying a backing sheet to the upper facing sheet to cover the openings in the latter and extend over the apertures in the plastic to form recesses.

7. In a machine for forming a composition board, a pair of rollers, means for passing a lower facing sheet over one of the rollers, means for delivering an upper facing sheet to the other roller, means for forming openings in the upper sheet having side flaps, means for applying a layer of plastic between the sheets as they pass between the rollers, and means for pressing the flaps on the upper sheet into the plastic and at the same time forming apertures in the plastic, said means being adapted to form the apertures with inclined side walls and to cover the side walls with the flaps whereby said apertures will have a dove-tail cross section.

8. In a machine for forming a composition wall board, means for forming an upper facing sheet with rows of openings, a pressing roller over which the facing sheet is passed having a series of teeth on its periphery adapted to engage the openings in the facing sheet, a second pressing roller arranged to co-operate with the first named pressing roller having a series of recesses with which the teeth engage to form punching dies, means for feeding a lower facing sheet between the rollers, said dies serving to punch openings in said lower facing sheet opposite the openings in the upper facing sheet, means for forming a layer of plastic between the facing sheets before they pass between the rollers, and means whereby the teeth will act to form apertures in the plastic between the openings in the facing sheets.

9. In a machine for forming a composition wall board, means for forming an upper facing sheet with rows of openings, a pressing roller over which the facing sheet is passed having a series of teeth on its periphery adapted to engage the openings in the facing sheet, a second pressing roller arranged to co-operate with the first named pressing roller having a series of recesses with which the teeth engage to form punching dies, means for feeding a lower facing sheet between the rollers, said dies serving to punch openings in said lower facing sheet opposite the openings in the upper facing sheet, means for forming a layer of plastic between the facing sheets before they pass between the rollers, means whereby the teeth will act to form apertures in the plastic between the openings in the facing sheets, and means for applying a backing sheet to one of the facing sheets to cover the openings and form recesses.

10. In a machine for forming a composition board, means for applying a plastic body between a pair of facing sheets, means for forming one of the facing sheets with openings having side flaps, and means for pressing the side flaps into the plastic body and simultaneously punching openings in the other facing sheet opposite the openings having side flaps.

11. In a machine for forming a composition board, means for applying a plastic body between a pair of facing sheets, means for forming one of the facing sheets with openings having side flaps, means for pressing the side flaps into the plastic body and simultaneously punching openings in the other facing sheet opposite the openings having side flaps, and means for applying a backing sheet to one of the facing sheets to cover the openings therein.

12. The method of forming a composition board consisting in applying a plastic body to an imperforate facing sheet, forming a second facing sheet with rows of openings, applying the second facing sheet over the plastic body, and pressing the plastic thru the openings in the facing sheet to form apertures therein, and punching openings in the first named facing sheet in register with the openings.

13. The method of forming a composition board consisting in applying plastic body to an imperforate facing sheet, forming a second facing sheet with rows of openings with flaps on the opposite sides of the openings, applying the second facing sheet to the plastic body, pressing the flaps into the plastic body and at the same time forming apertures in the body, and punching openings in the first named facing sheet in register with the apertures in the plastic body.

14. The method of forming a composition board consisting in applying plastic body to an imperforate facing sheet, forming a second facing sheet with rows of openings with flaps on the opposite sides of the openings, applying the second facing sheet to the plastic body, pressing the flaps into the plastic body and at the same time forming apertures in the body, punching openings in the first named facing sheet in register with the apertures in the plastic body, and applying a backing sheet to the second facing sheet to cover the openings.

WILLIAM D. HICKS.